United States Patent
Robert

(10) Patent No.: US 11,790,606 B2
(45) Date of Patent: Oct. 17, 2023

(54) DETERMINING CAMERA ROTATIONS BASED ON KNOWN TRANSLATIONS

(71) Applicant: Bentley Systems, Incorporated, Exton, PA (US)

(72) Inventor: Luc Robert, Valbonne (FR)

(73) Assignee: Bentley Systems, Incorporated, Exton, PA (US)

( * ) Notice: Subject to any disclaimer, the term of this patent is extended or adjusted under 35 U.S.C. 154(b) by 29 days.

(21) Appl. No.: 17/368,477

(22) Filed: Jul. 6, 2021

(65) Prior Publication Data
US 2023/0007962 A1    Jan. 12, 2023

(51) Int. Cl.
*G06T 17/20*    (2006.01)
*G06T 7/70*    (2017.01)
*G06T 7/579*    (2017.01)

(52) U.S. Cl.
CPC .............. *G06T 17/20* (2013.01); *G06T 7/579* (2017.01); *G06T 7/70* (2017.01); *G06T 2210/56* (2013.01)

(58) Field of Classification Search
None
See application file for complete search history.

(56) References Cited

U.S. PATENT DOCUMENTS

| | | |
|---|---|---|
| 10,497,177 B1 | 12/2019 | Côté et al. |
| 10,593,104 B2 | 3/2020 | Robert et al. |
| 10,957,062 B2 | 3/2021 | Gros |
| 2013/0155058 A1* | 6/2013 | Golparvar-Fard .......................... G06Q 10/06311 345/419 |
| 2015/0279016 A1* | 10/2015 | Kim ........................ G06T 7/521 382/154 |
| 2017/0251195 A1* | 8/2017 | Niehsen ................. G06V 20/56 |
| 2017/0254906 A1* | 9/2017 | Gowda .................... G01S 19/54 |
| 2017/0323472 A1* | 11/2017 | Barnes .................... G06T 15/04 |
| 2017/0337701 A1* | 11/2017 | Jovanovich ............... G06T 7/97 |
| 2018/0130255 A1* | 5/2018 | Hazeghi ............... H04N 13/243 |

(Continued)

OTHER PUBLICATIONS

Arth, Clemens, Gerhard Reitmayr, and Dieter Schmalstieg. "Full 6DOF pose estimation from geo-located images." Asian Conference on Computer Vision. Springer, Berlin, Heidelberg, 2012.*

(Continued)

*Primary Examiner* — Sultana M Zalalee
(74) *Attorney, Agent, or Firm* — Cesari and McKenna, LLP; James A. Blanchette

(57) ABSTRACT

In example embodiments, techniques are provided for calculating camera rotation using translations between sensor-derived camera positions (e.g., from GPS) and pairwise information, producing a sensor-derived camera pose that may be integrated in an early stage of SfM reconstruction. A software process of a photogrammetry application may obtain metadata including sensor-derived camera positions for a plurality of cameras for a set of images and determine optical centers based thereupon. The software process may estimate unit vectors along epipoles from a given camera of the plurality of cameras to two or more other cameras. The software process then may determine a camera rotation that best maps unit vectors defined based on differences in the optical centers to the unit vectors along the epipoles. The determined camera rotation and the sensor-derived camera position form a sensor-derived camera pose that may be returned and used.

20 Claims, 4 Drawing Sheets

(56) References Cited

U.S. PATENT DOCUMENTS

2020/0371214 A1    11/2020   Novel et al.
2021/0157001 A1    5/2021   Novel et al.

OTHER PUBLICATIONS

"Agisoft Metashape User Manual," Agisoft LLC, Professional Edition, Version 1.6, Nov. 25, 2020, pp. 1-172.
"ContextCapture®: Software to Automatically Generate Detailed 3D Models from Photographs," Quick Start Guide, Reality Modeling, CONNECT Edition, Bentley, Mar. 15, 2017, pp. 1-34.
Fischler, Martin A., et al., "Random Sample Consensus: A Paradigm for Model Fitting with Applications to Image Analysis and Automated Cartography," ACM, Graphics and Image Processing, Communications of the ACM, vol. 24, No. 6, Jun. 1981, pp. 381-395.
Luong, Q.-T., et al., "The Fundamental Matrix: Theory, algorithms and stability analysis," International Journal of Computer Vision, vol. 17, Jan. 1996, pp. 1-46.
Luong, Q.-T., et al., "Self-calibration of a Moving Camera from Point Correspondences and Fundamental Matrices," International Journal of Computer Vision, vol. 22, Mar. 1997, pp. 1-40.
Martinec, Daniel, et al., "Robust Rotation and Translation Estimation in Multiview Reconstruction," Center for Machine Perception, Czech Technical University, Reprint, IEEE, In Proceedings of the IEEE Conference on Computer Vision and Pattern Recognition Conference, IEEE, Minneapolis, MN, USA, Jun. 2007, pp. 1-8.
Morgan, Jacob A., et al., "How to VisualISFM: Vsfm," Department of Civil & Environmental Engineering, Colorado State University, Fort Collins, Colorado, Jan. 2016, pp. 1-21.
Moulon, Pierre, et al., "openMVG Documentation," Release 1.2, Oct. 8, 2017, pp. 1-88.
Nistér, David, "An Efficient Solution to the Five-Point Relative Pose Problem," IEEE, IEEE Transactions on Pattern Analysis and Machine Intelligence (TPAMI), vol. 26, Issue 6, Jun. 2004, pp. 1-17.
"PIX4D Mapper: Pix4Dmapper 4.1 User Manual," PIX4D, Pix4D SA, Dec. 14, 2017, pp. 1-305.
"Riemannian Computing in Computer Vision," Pavan K. Turaga and Anuj Srivastava, editors, Springer, Springer International Publishing Switzerland, 2016, pp. 145-164.
Schönberger, Johannes L., et al., "Structure-from-Motion Revisited," IEEE, Proceedings of the IEEE Conference on Computer Vision and Pattern Recognition (CVPR), Las Vegas, NV, USA, Jun. 2016, pp. 1-10.

\* cited by examiner

DETERMINING CAMERA ROTATIONS BASED ON KNOWN TRANSLATIONS

BACKGROUND

Technical Field

The present disclosure relates generally to photogrammetry, and more specifically to techniques for calculating camera rotations.

Background Information

In the design, construction and/or operation of infrastructure (e.g., buildings, factories, roads, railways, bridges, electrical and communication networks, equipment, etc.) it is often desirable to create models of a scene in which the infrastructure is built, or planned to be built. One type of model that may be created is a three-dimensional (3D) mesh that is based on a collection of vertices, edges and faces that defines shape. While 3D meshes may be manually constructed, automated techniques can save time and effort.

A number of automated techniques utilize photogrammetry. Using structure-from-motion (SfM) techniques, a 3D mesh may be reconstructed based on a set of source images (e.g., photographs) of a scene captured by one or more physical cameras. A typical photogrammetry workflow that employs SfM includes a number of stages. Among these, a a pose estimation stage estimates camera poses (i.e., rotations and positions) and produces an initial sparse 3D point cloud that represents the 3D structure of the scene, and a bundle adjustment stage optimizes camera pose and the position of keypoints in 3D space to refine the sparse 3D point cloud.

In some cases, metadata may be available that describes actual camera positions. For example, sensors, such as a global positioning system (GPS) receiver, may be co-located with physical cameras, and capable of capturing their position. Conventionally, however, metadata describing sensor-derived camera positions (e.g., from GPS) is not used (even if available) at early stages of a SfM reconstruction. Typically, in early stages, geometry in the images and knowledge of internal camera parameters (i.e. parameters intrinsic to a camera itself, such as the focal length and lens distortion) is relied upon. Metadata describing sensor-derived camera positions (even if available) is typically not utilized until late stages, usually bundle adjustment, where it is most often used as part of generating a global transform. Originally, this choice may have been due to the generally low accuracy of many sensor-derived camera positions (e.g., from standard GPS). More recently, Real Time Kinematic (RTK) correction, Post Processed Kinematic (PPK) correction and other enhancement techniques have improved the accuracy sensor-derived camera positions. However, they are still typically only utilized in late stages (e.g., in bundle adjustment). One reason for this persisting late integration is that there has not been an effective technique for determining camera rotations using sensor-derived camera positions using pairwise information.

Accordingly, there is a need for improved techniques for calculating camera rotations that can be used in SfM reconstruction.

SUMMARY

In example embodiments, techniques are provided for calculating camera rotation using translations between sensor-derived camera positions (e.g., from GPS) and pairwise information, producing a sensor-derived camera pose that may be integrated in an early stage of SfM reconstruction. A software process of a photogrammetry application may obtain metadata including sensor-derived camera positions for a plurality of cameras for a set of images and determine optical centers based thereupon. The software process may estimate unit vectors along epipoles from a given camera of the plurality of cameras to two or more other cameras. The software process then may determine a camera rotation that best maps unit vectors defined based on differences in the optical centers to the unit vectors along the epipoles. The determined camera rotation and the sensor-derived camera position form a sensor-derived camera pose that may be returned and used at an early stage of SfM reconstruction, such as in pairwise calculations.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein, the term "physical camera" refers to a physical device for recording images (e.g., photographs) of a scene. An example of a physical camera is a digital single-lens reflex (SLR) camera.

As used herein, the term "camera", when used without the modifier "physical", refers to a mathematical object defined according to a pinhole camera model that describes how an image was captured. There is a one-to-one correspondence between cameras and images captured at different positions and orientations. This is independent of the particular physical camera that may have captured the images. For example, if several images were produced by the same physical camera at several different positions and orientations, each image is considered to correspond to one camera, such that there are several cameras.

As used herein, the term "scene" refers to a portion of the physical environment. A scene may include infrastructure (e.g., buildings, factories, roads, railways, bridges, electrical and communication networks, equipment, etc.), terrain (e.g., earth, rock, water, etc.), and/or other physical features and objects.

Figure 1:
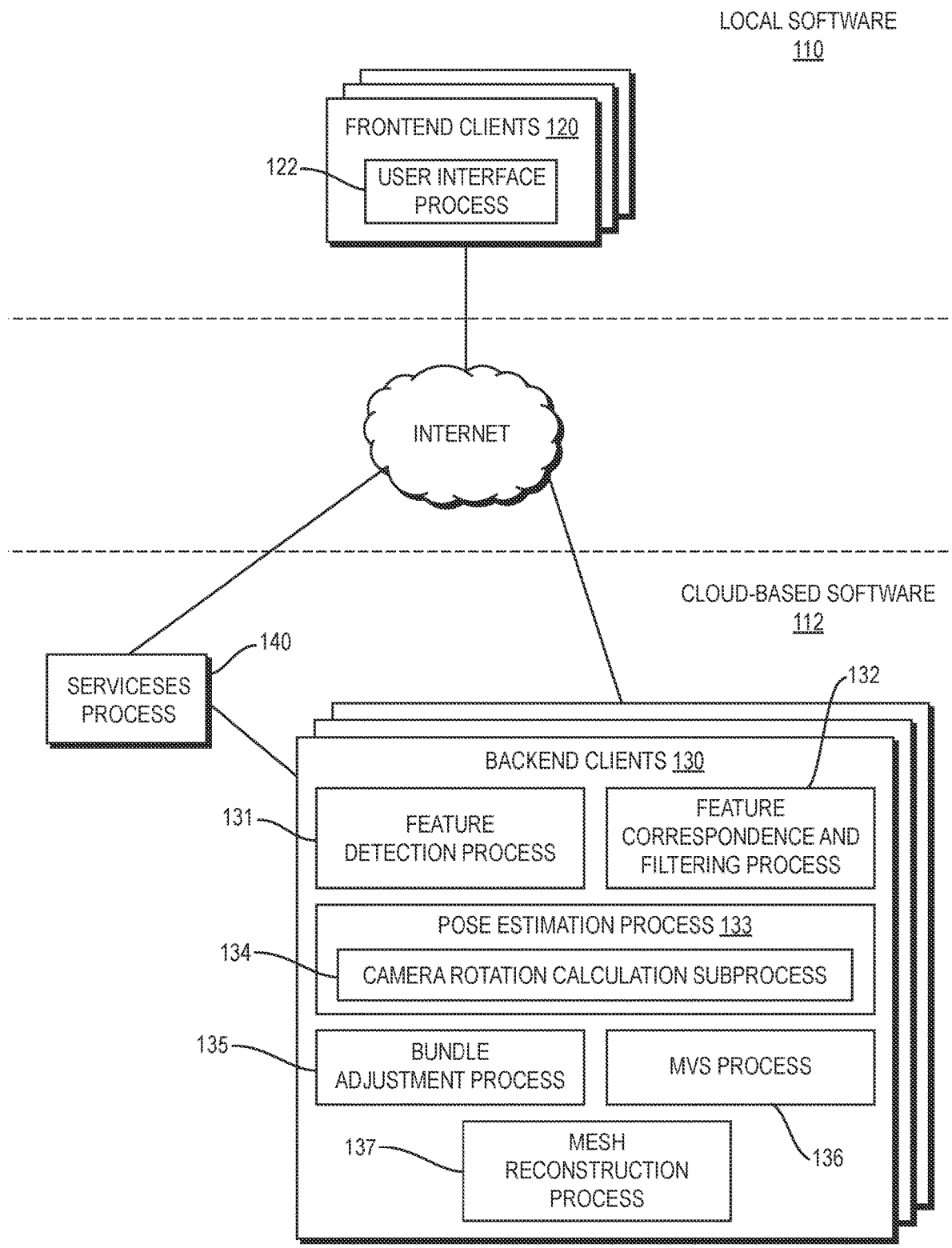
FIG. 1 is a high-level block diagram of an example software architecture for a photogrammetry application that may implement the techniques described herein.

Technical Details:

FIG. 1 is a high-level block diagram of an example software architecture for a photogrammetry application that may implement the techniques described herein. The photogrammetry application may be the ContextCapture™ application available from Bentley Systems, Inc., or another application developed by another vendor. The architecture may be divided into local software 110 executing on one or more computing devices arranged locally to an end-user (collectively "local devices"), and cloud-based software 112 executing on one or more computing devices remote from the end-user is ("cloud computing devices"), accessible via a network (e.g., the Internet). Each computing device may include processors, memory/storage, a display screen, and other hardware (not shown) for executing software, storing data and/or displaying information.

The local software 110 may include frontend clients 120, operating on local devices. The frontend clients 120 may be of various types, including desktop clients that operate directly under an operating system and web-based clients that operate within a web browser. The frontend clients 120 may, among a variety of other functionality, provide a user-interface to the photogrammetry application. To that end, the frontend clients 120 may include user interface processes 122, among other software processes.

The cloud-based software 112 may include backend clients 130 that operate on cloud computing devices. The backend clients 130 may perform, among a variety of other functions, including aero-triangulation, and multi-view stereo (MVS) processing, among other processing and memory resource intensive operations. To that end, backend clients 130 may include feature detection processes 131, feature correspondence and filtering processes 132, pose estimation processes 133, camera rotation calculation subprocesses 134, bundle adjustment processes 135, MVS processes 136, and mesh reconstruction processes 137, among other software processes. To improve performance, some backend clients 130 may be executed on different cloud computing devices and/or executed as different threads on the same cloud computing device, to take advantage of parallelism.

A services process 140 may functionally organize the photogrammetry application, managing interaction among the clients 120, 130 and their processes, and managing access to input, interim and output data. The input data may include sets of source images (e.g., photographs) 150 of scenes captured by physical cameras (not shown). A set of source images 150 may include metadata describing sensor-derived camera positions. These positions may be captured using a GPS receiver (not shown) of the physical camera(s), with precision enhance via RTK correction, PPK correction or other techniques. Alternatively, these camera positions may be captured using other sensors (not shown) of the physical camera(s), for example, relying upon Wi-Fi positioning, Bluetooth beacon-based positioning, dead reckoning, and/or other positioning techniques or combinations of techniques. The interim data may include sparse 3D point clouds 160 and dense 3D point clouds 170 that may be interim results of the photogrammetry application. The output data may include generated 3D meshes 180 that may be provided as output (e.g., displayed by the user interface process 122, stored to memory/storage, provided to another software application, etc.).

It should be understood that while a cloud-based processing architecture 100 is shown, a variety of other software architectures may alternatively be employed. For example, a stand-alone architecture may be employed, where user-interface functionality and processing-intensive operations are all implemented together on one computing device.

Figure 2:
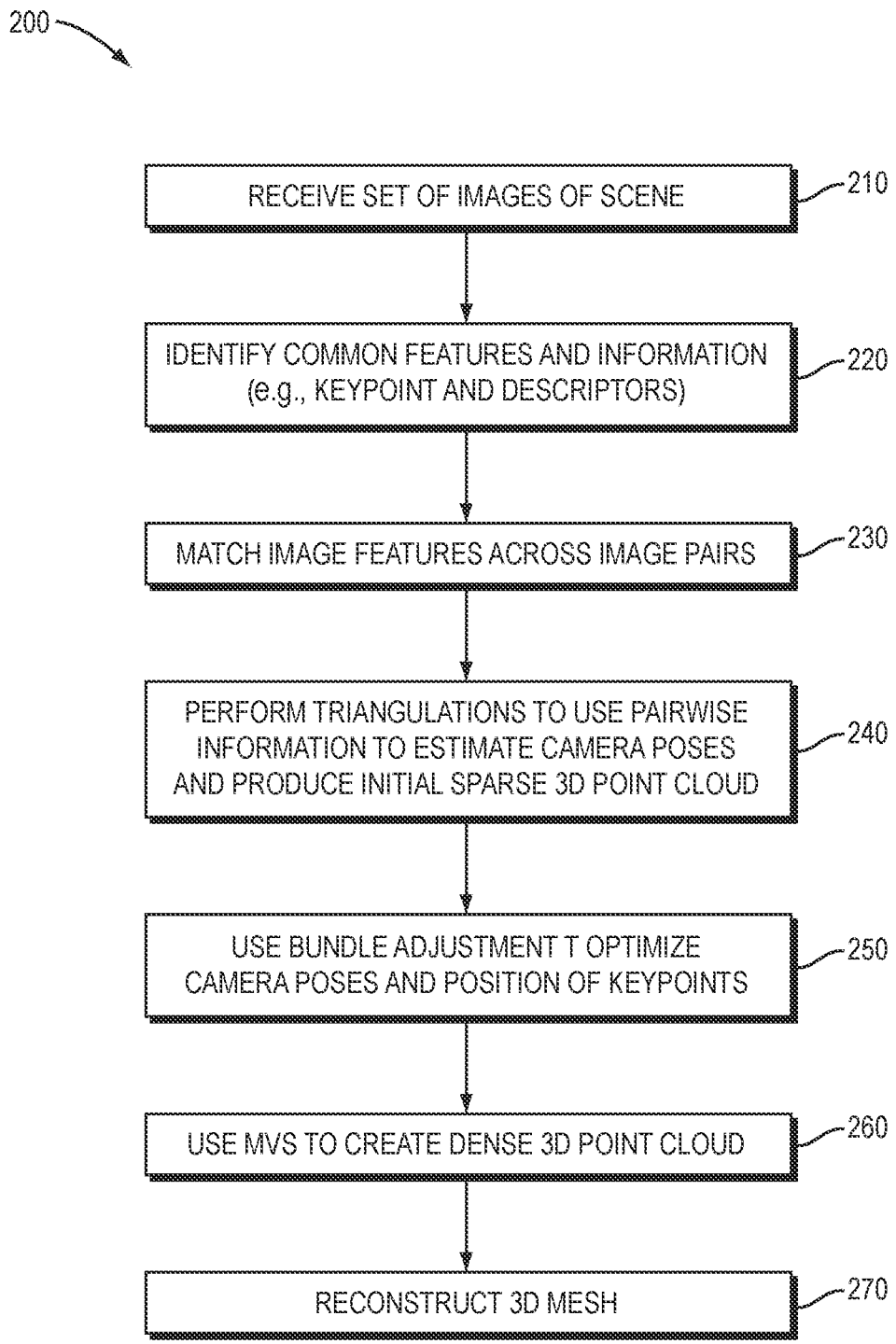
FIG. 2 is a flow diagram of an example sequence of steps that may be performed by the photogrammetry application to generate a 3D mesh from a set of source images of a scene.

FIG. 2 is a flow diagram an example sequence of steps 200 that may be performed by the photogrammetry application to generate a 3D mesh 180 from a set of source images 150 of a scene. At step 210, the photogrammetry application receives a set of images 150 of a scene captured by one or more physical cameras. Preferably, the images have significant image overlap and are captured from unique locations. As part of step 210, image enhancements or resizing may be performed.

At step 220, a feature detection process 131 of the photogrammetry application identifies common image features in individual images across the set of images, and computes information describing these image features. The image features typically take the form of keypoints (i.e. image locations with distinctive contrast or texture), and the information typically takes the form of descriptors (i.e. vectors that describe pixels around a keypoint). The descriptors generally provide information usable to determine which keypoints are a two-dimensional (2D) representation of the same 3D point in the scene.

At step 230, a feature correspondence and filtering process 132 of the photogrammetry application matches image features across image pairs. To compute a match, a distance (e.g., a Euclidean distance) between descriptors is generally used. A robust outlier detection algorithm, such as RANdom Sample Consensus (RANSAC) may be employed to reject potentially erroneous matches in image pairs by testing for consistency. This may be done by checking if a possible match across image pairs fulfils an epipolar geometry constraint (i.e. that the displacements of keypoints are a possible result solely of camera motion between both images). A filtering algorithm may also be employed to eliminate image pairs that include a small number of matches (e.g., based on a comparison to a threshold) and are therefore not meaningful. A complete set of image correspondences for the set of images is obtained after considering all meaningful image pairs.

At step 240, a pose estimation process 123 the photogrammetry application performs operations to estimate camera poses (i.e., rotations and positions) and produce an initial sparse 3D point cloud 160 that represents the 3D structure of the scene. Conventionally, metadata describing sensor-derived camera positions (e.g., from GPS) is not used here (even if available). Instead, geometry in the images and knowledge of internal camera parameters (i.e. parameters intrinsic to the cameras themselves, such as the focal length and lens distortion) is relied upon.

In a first phase of this step, pairwise camera geometry is estimated. In this phase relative camera pose for each image pair is derived. Then, in a second phase, global camera geometry is estimated. Camera pose is estimated by first estimating rotations for camera(s) (e.g., using global averaging), and then deriving translations for camera(s) using the estimated rotations. The second phase recovers camera poses as well as the position of keypoints in 3D space. The position of keypoints in 3D space form the sparse 3D point cloud 160. Depending on the implementation, incremental methods or direct methods may be employed. In incremental methods, a set of estimated camera poses and position of keypoints in 3D space is gradually grown by adding cameras one-by-one, and successively performing estimations. In direct methods, all cameras are added at once, and a single estimation is performed.

As explained in more detail below in reference to FIGS. 3 and 4, according to embodiments of the present invention, step 240 may be modified to utilize metadata describing sensor-derived camera positions (e.g., from GPS). Specifically, a camera rotation calculation subprocess 134 may perform operations to calculate camera rotations from translations between sensor-derived camera positions (e.g., from GPS) and pairwise information, producing a sensor-derived camera pose. By determining and integrating sensor-derived camera-pose at an early stage of the process, calculation efficiency may be improved, thereby reducing processor and memory resource consumption, and further statistical filtering may be possible, thereby addressing noise without relying upon global optimizations involving all cameras, among other benefits.

At step 250, a bundle adjustment process 135 of the photogrammetry application optimizes camera pose and the position of keypoints in 3D space to refine the sparse 3D point cloud 160. Typically, bundle adjustment involves a robust non-linear minimization of re-projection errors. Depending on the particular bundle adjustment algorithm used, bundle adjustment may be performed one or several times, on the whole dataset and/or subsets of it. In incremental methods, bundle adjustment typically is performed after each incremental estimation. In direct methods, bundle adjustment typically is performed once after the global estimation. It should be understood that, in incremental estimation approaches, execution may loop between steps 250 and 240 to perform bundle adjustment repeatedly as cameras are added one-by-one.

As part of step 250, camera pose and position of keypoints in 3D space may be scaled and georeferenced. Typically, a global transform is generated for all cameras under consideration (i.e. all cameras for direct methods, or a growing subset of cameras for incremental methods) that best maps camera positions in 3D space to actual camera positions. Conventionally, this is where metadata including sensor-derived camera positions (e.g., from GPS) is first utilized. The sensor-derived camera positions (e.g., from GPS) are typically used, in some cases together with sensor-derived positions (e.g., from GPS) for specific 3D points (i.e. "ground control points" (GDPs)), to generate and refine the global transform through bundle adjustment.

As mentioned above, according to embodiments of the present invention, metadata describing sensor-derived camera pose may be determined and used earlier as part of step 240, with camera rotations being calculated from sensor-derived camera positions (e.g., from GPS). When this is implemented, the global transform may not be relied upon for integrating all sensor-derived camera position (e.g., from GPS) information.

At step 260, a MVS process 136 of the photogrammetry application intensifies the sparse 3D point cloud 160 to create a dense 3D point cloud 170. As mentioned above, the sparse 3D point cloud 160 typically only includes keypoints in 3D space. A MVS algorithm extends this, operating on pixel values, to provide a dense representation of surfaces in the scene that include a much greater number of points positioned in 3D space.

Finally, at step 270, a mesh reconstruction construction process 137 of the photogrammetry application reconstructs a 3D mesh 180 (i.e. a collection of vertices, edges and faces that defines shape) from the dense 3D point cloud 170. Various algorithms may be used in performing the mesh reconstruction, including Poisson surface reconstruction algorithms or 3D Delaunay triangulation algorithms. In some cases, the 3D mesh 180 may be a multi-resolution 3D mesh that includes a number of different resolutions or levels of detail (LODs). The 3D mesh 180 may be displayed on a display screen by the user interface process 122, stored to memory/storage, provided to another software application, or otherwise utilized.

Figure 3:
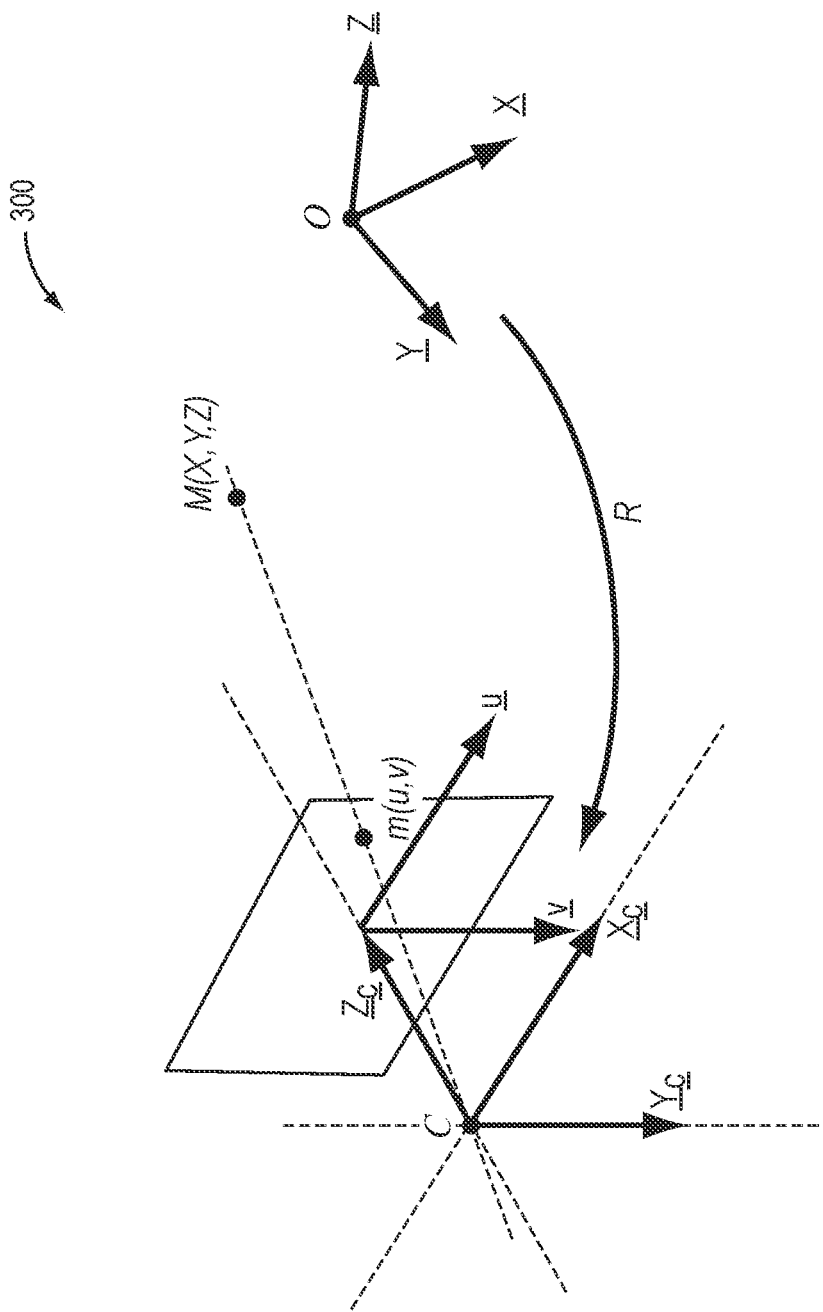
FIG. 3 is a diagram illustrating a global coordinate system and a pinhole camera model that may be referred to in describing techniques for calculating camera rotations using sensor-derived camera position (e.g., from GPS) and pairwise information.

FIG. 3 is a diagram 300 illustrating a global coordinate system and a pinhole camera model that may be referred to in describing techniques for calculating camera rotations using sensor-derived camera position (e.g., from GPS) and pairwise information. As illustrated in FIG. 3, 3D space of a scene may be expressed with an orthonormal coordinate system (O, $\underline{X}$, $\underline{Y}$, $\underline{Z}$), where O is the origin, and X, Y, Z are three vectors that define coordinate axes. A physical camera may be assumed to follow a pinhole model, in that, when it captures an image, it may be defined by an optical center C (a point) and an image plane (a plane onto which a scene is projected to form the image). The optical center may be attached to a system of coordinates (C, $\underline{X}_c$, $\underline{Y}_c$, $\underline{Z}_c$) whose axes define the image plane's orientation. By convention, $Z_c$ is orthogonal to the image plane pointing towards the observed scene, $\underline{X}_c$ is oriented along the horizontal axis of the image, and ($\underline{X}_c$, $\underline{Y}_c$, $\underline{Z}_c$) is an orthonormal, direct basis.

Projection of a point M in the 3D space of the scene involves intersecting its optical ray (i.e. the ray joining M with the optical center C) with the image plane. The intersection is an image point m that may correspond to a pixel of the image. The image point (pixel) m may have coordinates (u,v) in a coordinate system (o, $\underline{u}$,$\underline{v}$) defined in the image plane. A 3×3 rotation matrix R maps coordinates of a vector expressed in the coordinate system (O, $\underline{X}$, $\underline{Y}$, $\underline{Z}$) in the coordinate system (C, $\underline{X}_c$, $\underline{Y}_c$, $\underline{Z}_c$). As such, a projection equation that relates point M expressed in both coordinate systems may be given as:

$$\begin{bmatrix} X_c \\ Y_c \\ Z_c \end{bmatrix} = R\left(\begin{bmatrix} X \\ Y \\ Z \end{bmatrix} - C\right),$$

and coordinates of the image point m given by:

$$\begin{cases} u = X_c/Z_c \\ v = Y_c/Z_c \end{cases}.$$

In these equations, the image point (pixel) coordinates may be expressed as normalized coordinates (i.e. an ideal pinhole model is followed with a unit focal length and no non-linear distortion) When dealing with image points (pixels) from real images, a 2D transformation may be applied to normalized coordinates in each image, in order to obtain the corresponding image points (pixels). This transform may be determined from knowledge of internal camera parameters (e.g., focal length, sensor size, etc.), estimated using self-calibration algorithms, or otherwise determined.

Remembering that the term "camera" without the modifier "physical" refers to a mathematical object like that discussed above, it should be clear that projections of a point onto two cameras (referred to as camera 1 and camera 2) is related by epipolar geometry. For the translation 3 dimension vector ("3-vector") $t_{12}$ from camera 1 to camera 2, and the 3×3 rotation matrix $R_{1,2}$ representing rotation between camera 1 and camera 2's coordinate systems respectively, and $(u_1,v_1),(u_2,v_2)$ the coordinates of image points (pixels) for camera 1 and camera 2, respectively, we have:

$$[u_2 \; v_2 \; 1] t_{12} \times R_{12} \begin{bmatrix} u_1 \\ v_1 \\ 1 \end{bmatrix} = 0.$$

The image of optical center $C_2$ projected onto camera 1 (i.e., the epipole) is represented in homogenous coordinates by the 3-vector:

$$e_{12} = -R_{12}{}^T t_{12}.$$

The unit vector along the epipole $\hat{e}_{12}$ towards camera 2, expressed in the coordinate system of camera 1, may be given as:

$$\hat{e}_{12} = \alpha \cdot e_{12},$$

where $\alpha$ is a scalar.

The case for two cameras may be extended to N cameras. For a collection of pairs of cameras of indexes i and j, using photogrammetry techniques it is possible to obtain an estimate of the translation 3-vector $t_{ij}$ and the 3×3 rotation matrix $R_{i,j}$, hence epipole $e_{12}$. This typically is performed in photogrammetry when camera i and camera j observe a common portion of the scene, by determining the Essential Matrix or the Fundamental Matrix, and then deriving the unit vector along the epipole $\hat{e}_{ij}$ towards camera j, expressed in the coordinate system of camera i. Assuming pairwise estimates are perfectly accurate, it may be stated that:

$$\frac{1}{\|C_j - C_i\|} R_i (C_j - C_i) = \hat{e}_{ij},$$

where $C_i$ is the optical center of camera i, $C_j$ is the optical center of camera j, and $R_i$ is a rotation matrix indicating the orientation of camera i in the 3D space of the scene. It is possible to estimate rotation matrix $R_i$ because all the other data in the equation is known, either directly from sensor-derived camera positions (e.g., from GPS) in the case of optical centers $C_i$ and $C_j$, or as the result of traditional epipolar geometry calculations, in the case of the unit vector along the epipole $\hat{e}_{ij}$.

Assuming that there are multiple cameras $j_1 \ldots j_k \ldots j_m$ for which pairwise motion can be estimated with camera i, rotation matrix $R_i$ may be computed as the matrix that best maps unit 3-vectors $$\frac{C_{j_k} - C_i}{\|C_{j_k} - C_i\|}$$

onto unit vectors along the epipoles $\hat{e}_{ij_k}$ for k=1 ... n. The solution is unique as soon as at least two of the unit vectors along the epipoles $\hat{e}_{ij_k}$ and their corresponding unit 3-vectors vectors $$\frac{C_{j_k} - C_i}{\|C_{j_k} - C_i\|}$$

are not collinear.

The problem can be restated in a general sense as solving for a rotation matrix R that best maps unit 3-vectors $a_1 \ldots a_n$ onto unit vectors $b_1 \ldots b_n$. An approximate solution for rotation matrix R may be determined for the problem in a variety of different ways.

For example, an approximate solution for rotation matrix R may be determined by performing a singular value decomposition of the 3×3 matrix $K = \Sigma_{k=1}^n a_k b_k^T$ and cancelling the inside diagonal matrix. More precisely, the singular value decomposition $K = USV^T$ may be computed where U and V are both orthonormal 3×3 matrices, and S is a 3×3 diagonal matric. The rotation matrix R may then be obtained as:

$$R = V \begin{pmatrix} 1 & 0 & 0 \\ 0 & 1 & 0 \\ 0 & 0 & \det(VU^T) \end{pmatrix} U^T.$$

Alternatively, an approximate solution for rotation matrix R may be determined using unit quaternions. Representing a quaternion q as a pair $(\alpha, v)$, where $\alpha$ is a scalar and v is a 3-vector, the product of two quaternions may be defined as:

$$qq' = (\alpha,v)(\alpha',v') = (\alpha\alpha' - v \cdot v', \alpha v' + \alpha' v + v \times v').$$

The conjugate of a quaternion is $\bar{q} = (\alpha, -v)$ and the norm of a quaternion is $\|q\|^2 = q\bar{q}$. A rotation R can be represented by a quaternion q such that $\|q\|^2 = \alpha^2 + \|v\|^2 = 1$. The image of vector a by rotation R is represented by the quaternion $qa\bar{q}$. Using the above properties, $Ra = b$ translates into the following equation of quaternions:

$$qa = bq.$$

Assuming a and b are known and quaternion q is unknown, this equation is linear, homogeneous in the four coefficients of q. Provided there are n such equations mapping $a_k$ onto $b_k$, there is a linear, homogeneous system $Aq = 0$, where A is a n×4 matrix and q is the 4-dimension vector ("4-vector") of q's coefficients, under the constraint that $\|q\|^2 = 1$. The approximate solution may be obtained by finding the eigenvector of the 4×4 matrix $A^T A$ with the smallest eigenvalue. This can be accomplished using the singular value decomposition of $A^T A$.

Accordingly, in the above described manner, for any camera for which there are two distinct unit vectors along the epipoles $\hat{e}_{ij_k}$ with other cameras available, the rotation $R_i$ of the camera in the 3D space of the scene may be calculated.

Figure 4:
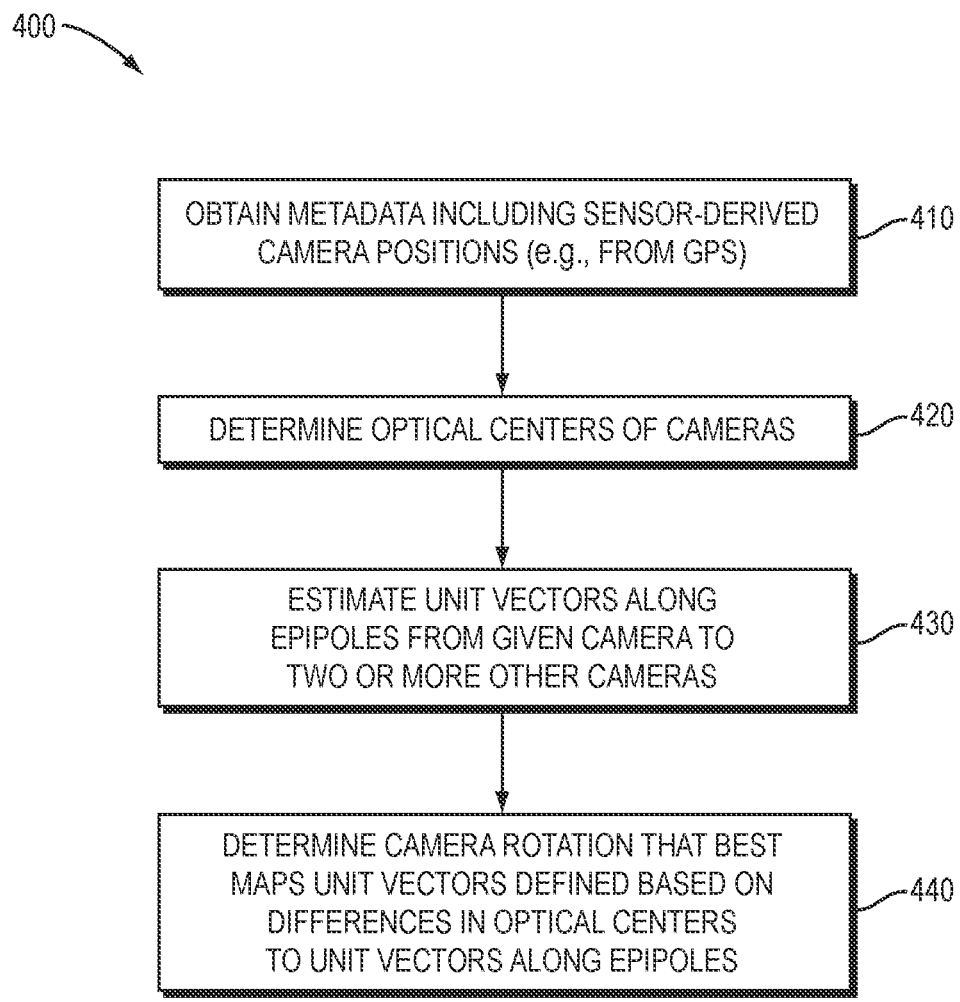
FIG. 4 is a flow diagram of an example sequence of steps that may be performed by a camera rotation calculation subprocess to calculate camera rotations using sensor-derived camera position (e.g., from GPS) and pairwise information.

FIG. 4 is a flow diagram of an example sequence of steps 400 that may be performed by the camera rotation calculation subprocess 134 as part of step 240 of FIG. 2 to calculate camera rotations using sensor-derived camera position (e.g., from GPS) and pairwise information. Several of the steps 400 may serve to summarize the operations discussed above in reference to FIG. 3.

At step 410, the camera rotation calculation subprocess 134 obtains metadata including sensor-derived camera positions (e.g., from GPS). The metadata describing sensor-derived camera positions may be included in the set of images 150, and step 240 may involve extracting the relevant information.

At step 420, the camera rotation calculation subprocess 134 determines optical centers of cameras. In one implementation, the optical centers of cameras may be approximated as the sensor-derived camera positions (e.g., from GPS).

At step 430, the camera rotation calculation subprocess 134 estimates unit vectors along the epipoles from a given camera to two or more other cameras. As discussed above, for cameras $j_1 \ldots j_k \ldots j_m$ this may involve estimating unit vectors along the epipoles $\hat{e}_{ij_k}$ for k=1 ... n using photogrammetry techniques when camera i and camera j observe a common portion of the scene, by determining the Essential Matrix or the Fundamental Matrix, and then deriving the unit vector along the epipole $\hat{e}_{ij}$ towards camera j.

At step 440, the camera rotation calculation subprocess 134 determines a camera rotation in the 3D space of the scene that best maps unit vectors defined based on differences in the optical centers determined from sensor-derived camera positions (from step 420) to the unit vectors along the epipoles (from step 430). As discussed above, provided there are multiple camera pairs available, an approximate solution may be determined using a singular value decomposition and cancelling the inside diagonal matrix or using unit quaternions.

The sensor-derived camera position (e.g., from GPS) for the given camera and the determined camera rotation for the given camera (from step 440) forms a sensor-derived camera pose. At step 450, the sensor-derived camera pose of the given camera is returned by the camera rotation calculation subprocess 134. The returned sensor-derived camera pose may be used in the pairwise calculations of step 240 of FIG. 2 to produce the initial sparse 3D point cloud 160 that represents the 3D structure of the scene.

Integrating sensor-derived camera-pose at an early stage of the process may have a number of advantages, as mentioned above. Calculation efficiency may be improved, thereby reducing processor and memory resource consumption. Using the present techniques, it is possible to compute camera rotation in the 3D space of the scene from sensor-derived camera position using only pairwise relations between the given camera and other cameras that observe a common portion of the scene. In typical implementations, this may be a very small subset of all cameras (e.g., a few dozen cameras verses thousands of cameras). Conventionally, camera rotation in the 3D space of the scene has been determined as part of calculating a global transform via bundle adjustment, involving all cameras and all camera relations. Using the present techniques, computation may scale with linear complexity relative to the total number of cameras and with cubic complexity relative to the number of pairwise relations per camera. Conventionally, computation has scaled with cubic complexity relative to the total number of cameras, consuming greater processor and memory resource. The larger the number of cameras, the greater the reduction in processor and memory resource consumption the present techniques may provide.

In addition to better scaling, efficiency may be improved by allowing for better processing parallelism. Computations of camera rotation in the 3D space of the scene for different given cameras may be performed in parallel since they are independent of each other, using only pairwise relations between the given camera and other cameras that observe a common portion of the scene. As such, they may take better advantage of multithreading, multi-core processing architectures and other types of processing parallelism.

Further, integrating sensor-derived camera-pose at an early stage of the process may enable greater statistical filtering at an early stage. Statistical filtering algorithms, such as RANSAC, may be employed to address errors such as wrong feature point correspondences due, for instance, due to the noise present in the data. This may reduce the amount of work needed in the subsequent steps of the process by providing them cleaner data to work with, increasing efficiency and robustness.

In summary, techniques are provided to calculate camera rotation using translations between sensor-derived camera positions (e.g., from GPS) and pairwise information, producing a sensor-derived camera pose that may be integrated at an early stage of a SfM reconstruction process. It should be understood that a wide variety of adaptations and modifications may be made to the techniques. While specific example software and hardware is discussed above, it should be understood that the techniques may be implemented using a variety of different types of software, hardware, and combination thereof. Such software may include executable instructions stored in a non-transitory computing device-readable medium, such as a volatile or persistent memory device, a hard-disk, or other data storage. Such hardware may include a variety of types of processors, memory chips, programmable logic circuits, application specific integrated circuits, and/or other types of hardware components that support execution of software. Combinations of software and hardware may be adapted to suit different environments and applications. Above all, it should be understood that the above descriptions are meant to be taken only by way of example.

What is claimed is:

1. A method for calculating camera rotation using translations between sensor-derived camera positions, in a structure-from-motion (SfM) reconstruction of a scene from a set of images, comprising:
    obtaining metadata including sensor-derived camera positions for a plurality of cameras for the set of images;
    prior to performing pairwise calculations of the SfM reconstruction of the scene, determining camera rotation from the sensor-derived camera positions to form a sensor-derived camera pose by
        determining optical centers of the plurality of cameras based on the sensor-derived camera positions,
        estimating, by a software process of a photogrammetry application executing on one or more computing devices, unit vectors along epipoles from a given camera of the plurality of cameras to two or more other cameras, and
        determining, by the software process, a camera rotation that best maps unit vectors defined based on differences in the optical centers to the unit vectors along the epipoles, the determined camera rotation and the sensor-derived camera position forming the sensor-derived camera pose; and
    using the previously determined sensor-derived camera pose of the given camera in the pairwise calculations of the SfM reconstruction of the scene.

2. The method of claim 1, wherein the sensor-derived camera positions are global positioning system (GPS) positions.

3. The method of claim 1, wherein the estimating unit vectors along epipoles comprises selecting cameras that observe a common portion of the scene and determining an Essential Matrix or a Fundamental Matrix based on the selected cameras.

4. The method of claim 1, wherein the determining the camera rotation that best maps the unit vectors defined based on differences in the optical centers to the unit vectors along the epipoles comprises calculating an approximate solution using a singular value decomposition.

5. The method of claim 1, wherein the determining the camera rotation that best maps the unit vectors defined based on differences in the optical centers to the unit vectors along the epipoles comprises calculating an approximate solution using unit quaternions.

6. The method of claim 1, further comprising:
producing a sparse three-dimensional (3D) point cloud that represents the 3D structure of the scene;
intensifying the sparse 3D point cloud to create a dense 3D point cloud of the scene; and
reconstructing a 3D mesh of the scene from the dense 3D point cloud.

7. The method of claim 6, further comprising:
at least one of displaying the 3D mesh on a display screen of the one or more computing devices, storing the 3D mesh to memory or storage of the one or more computing devices, or providing the 3D mesh to another software application executing on the one or more computing devices.

8. A computing device comprising:
a processor; and
a memory coupled to the processor and configured to store a photogrammetry application and a set of images of a scene that include metadata indicating sensor-derived camera positions, the photogrammetry application configured to reconstruct the scene from the set of images using, in part, a camera rotation calculation subprocess, the camera rotation calculation subprocess configured to:
determine optical centers of a plurality of cameras for the set of images based on the sensor-derived camera positions,
estimate unit vectors along epipoles from a given camera of the plurality of cameras to two or more other cameras,
determine a camera rotation from the sensor-derived camera positions to form a sensor-derived camera pose by determining a camera rotation that best maps unit vectors defined based on differences in the optical centers to the unit vectors along the epipoles, the determined camera rotation and the sensor-derived camera position forming the sensor-derived camera pose, and
return the sensor-derived camera pose of the given camera; and
the photogrammetry application configured to
use the returned sensor-derived camera pose of the given camera in pairwise calculations to reconstruct the scene.

9. The computing device of claim 8, wherein the sensor-derived camera positions are global positioning system (GPS) positions.

10. The computing device of claim 8, wherein camera rotation calculation subprocess is further configured to estimate unit vectors along epipoles by selecting cameras that observe a common portion of the scene and determining an Essential Matrix or a Fundamental Matrix based on the selected cameras.

11. The computing device of claim 8, wherein camera rotation calculation subprocess is further configured to determine the camera rotation that best maps the unit vectors defined based on differences in the optical centers to the unit vectors along the epipoles by calculating an approximate solution using a singular value decomposition.

12. The computing device of claim 8, wherein camera rotation calculation subprocess is configured to determine the camera rotation that best maps the unit vectors defined based on differences in the optical centers to the unit vectors along the epipoles by calculating an approximate solution using unit quaternions.

13. The computing device of claim 8, wherein the photogrammetry application is further configured to:
produce a sparse three-dimensional (3D) point cloud that represents the 3D structure of the scene;
intensify the sparse 3D point cloud to create a dense 3D point cloud of the scene; and
reconstruct a 3D mesh of the scene from the dense 3D point cloud.

14. The computing device of claim 13, wherein the photogrammetry application when executed is further operable to:
display the 3D mesh on a display screen of the one or more computing devices, store the 3D mesh to memory or storage of the one or more computing devices, or provide the 3D mesh to another software application executing on the computing device.

15. A non-transitory computing device readable medium having instructions stored thereon, the instructions when executed by one or more computing devices operable to:
obtain metadata including sensor-derived camera positions for a plurality of cameras for a set of images of a scene;
prior to performing pairwise calculations of a structure-from-motion (SfM) reconstruction of a scene from a set of images,
determine optical centers of the plurality of cameras based on sensor-derived camera positions,
estimate unit vectors along epipoles from a given camera of the plurality of cameras to two or more other cameras, and
determine a camera rotation from the sensor-derived camera positions to form a sensor-derived camera post by determining a camera rotation that best maps unit vectors defined based on differences in the optical centers to the unit vectors along the epipoles, the determined camera rotation and the sensor-derived camera position forming sensor-derived camera pose of the given camera; and
use the previously determined sensor-derived camera pose of the given camera in the pairwise calculations of the SfM reconstruction of the scene.

16. The non-transitory computing device readable medium of claim 15, wherein the sensor-derived camera positions are global positioning system (GPS) positions.

17. The non-transitory computing device readable medium of claim 15, wherein the instructions that when executed are operable to estimate unit vectors along epipoles comprise instructions that when executed are operable to select cameras that observe a common portion of the scene and determine an Essential Matrix or a Fundamental Matrix based on the selected cameras.

18. The non-transitory computing device readable medium of claim 15, wherein the instructions that when executed are operable to determine the camera rotation that best maps the unit vectors defined based on differences in the optical centers to the unit vectors along the epipoles comprise instructions that when executed are operable to calculate an approximate solution using a singular value decomposition.

19. The non-transitory computing device readable medium of claim 15, wherein the instructions that when executed are operable to determine the camera rotation that best maps the unit vectors defined based on differences in the optical centers to the unit vectors along the epipoles comprise instructions that when executed are operable to calculate an approximate solution using unit quaternions.

20. The non-transitory computing device readable medium of claim 15, wherein the instructions when executed by one or more computing devices are further operable to:
- produce a sparse three-dimensional (3D) point cloud that represents the 3D structure of the scene;
- intensify the sparse 3D point cloud to create a dense 3D point cloud of the scene;
- reconstruct a 3D mesh of the scene from the dense 3D point cloud; and
- at least one of display the 3D mesh on a display screen of the one or more computing devices, store the 3D mesh to memory or storage of the one or more computing devices, or provide the 3D mesh to another software application executing on the one or more computing devices.

* * * * *

UNITED STATES PATENT AND TRADEMARK OFFICE
CERTIFICATE OF CORRECTION

PATENT NO. : 11,790,606 B2
APPLICATION NO. : 17/368477
DATED : October 17, 2023
INVENTOR(S) : Luc Robert It is certified that error appears in the above-identified patent and that said Letters Patent is hereby corrected as shown below:

In the Specification

Column 3, Line 16 reads:
"the end-user is ("cloud computing-devices"), accessible via"
Should read:
--the end-user ("cloud computing devices"), accessible via--

Column 6, Line 22 reads:
"axes define the image plane's orientation. By convention, Zc"
Should read:
--axes define the image plane's orientation. By convention, Zc--

Column 8, Line 6 reads:
"position of the 3×3 matrix $K=\Sigma_{k=1}^{n}a_k b_k^T$ and cancelling the"
Should read:
--position of the 3×3 matrix  and cancelling the--

Signed and Sealed this
Eleventh Day of February, 2025

Coke Morgan Stewart
*Acting Director of the United States Patent and Trademark Office*